(12) United States Patent
Chiu et al.

(10) Patent No.: US 9,797,444 B1
(45) Date of Patent: Oct. 24, 2017

(54) THREADLESS LINEAR GUIDE

(71) Applicant: HIWIN TECHNOLOGIES CORP, Taichung (TW)

(72) Inventors: Yung-Shen Chiu, Taichung (TW); Shi-Jin Tao, Taichung (TW)

(73) Assignee: HIWIN TECHNOLOGIES CORP, Taichung (TW)

( * ) Notice: Subject to any disclaimer, the term of this patent is extended or adjusted under 35 U.S.C. 154(b) by 0 days.

(21) Appl. No.: 15/144,827

(22) Filed: May 3, 2016

(51) Int. Cl.
  *F16C 29/06* (2006.01)
(52) U.S. Cl.
  CPC ...... *F16C 29/0609* (2013.01); *F16C 29/0657* (2013.01)
(58) Field of Classification Search
  CPC ............. F16C 29/0633; F16C 29/0652; F16C 29/0654; F16C 29/0657; F16C 29/0666; F16C 29/0669; F16C 29/0671; F16C 29/0673; F16C 29/0609
  See application file for complete search history.

(56) References Cited

U.S. PATENT DOCUMENTS

| | | | | |
|---|---|---|---|---|
| 6,170,986 B1* | 1/2001 | Hsu | ..................... | F16C 29/0607 384/13 |
| 6,558,039 B2* | 5/2003 | Wu | ..................... | F16C 29/0657 384/45 |
| 8,197,140 B2* | 6/2012 | Wang | ................... | F16C 29/0657 384/43 |
| 2001/0003854 A1* | 6/2001 | Lee | ..................... | E05D 15/0643 16/94 R |
| 2002/0102035 A1* | 8/2002 | Kuwahara | ............... | F16C 43/04 384/45 |
| 2004/0120616 A1* | 6/2004 | Akiyama | ............ | F16C 29/0633 384/45 |
| 2013/0177267 A1* | 7/2013 | Tsao | ..................... | F16C 29/0657 384/43 |

\* cited by examiner

*Primary Examiner* — Alan B Waits
(74) *Attorney, Agent, or Firm* — Leong C. Lei (57) ABSTRACT

A threadless linear guide includes a rail, a slide block, a recirculation assembly, and a fixing member. The slide block, the recirculation assembly, and the fixing member are positionable with respect to each other through retention engagements therebetween so that the components can be coupled to each other without screws. A reinforcement plate is provided for reinforcing the strength of the recirculation assembly for the recirculation assembly is generally formed of injecting molding, while the fixing member and the reinforcement plate are made of metal. Thus, with the fixing member and the reinforcement plate enclosing the recirculation assembly, any foreign object jamming in the interior would not cause the rolling bodies to eject out through the recirculation assembly during the operation of rolling bodies.

3 Claims, 8 Drawing Sheets

FIG. 7 ial direction and each comprising two extension blocks projecting therefrom and spaced from each other, each of the extension blocks comprising a retention slot formed therein, the slide block comprising fourth positioning sections; a recirculation assembly, which comprises third positioning sections respectively corresponding to and engageable with the fourth positioning sections such that the third positioning sections and the fourth positioning sections are mutually coupled to each other through a recess-projection engagement arrangement therebetween for having the recirculation assembly positioning on the slide block, the recirculation assembly having two opposite end faces in the axial direction, the end faces being respectively jointed to inside surfaces of the retention slots, the end faces each comprising at least one first positioning section, the recirculation assembly comprising two recirculation passageways respectively connected to and communication with the two loading paths such that each of loading paths and the recirculation passageway connected thereto collectively define a circulation way; and a fixing member, which comprises a connection section and two positioning plates respectively mounted to two ends of the connection section, the connection section and the positioning plates being all in the form of a plate, the two positioning plates having a thickness that is smaller than a width of the retention slots, the connection section being of a curved configuration without an external force acting thereon such that a spacing distance between upper end sections of the two positioning plates is greater than a spacing distance of lower end sections, the connection section being positionable against the upper bottom surface, the two positioning plates being respectively positionable against the two end faces of the recirculation assembly with the upper end sections of the two positioning plates respectively inserted into the retention slot, the positioning plates each comprising at least one second positioning section corresponding to and engageable with the first positioning sections, the first positioning sections and the second positioning sections being mutually coupled to each other through a recess-projection engagement arrangement therebetween, such that the fixing member constrains the degree of freedom of the recirculation assembly in the axial direction.# THREADLESS LINEAR GUIDE

(a) TECHNICAL FIELD OF THE INVENTION

The present invention relates generally to a linear guide, and more particularly to a threadless linear guide.

(b) DESCRIPTION OF THE PRIOR ART

Figure 7:
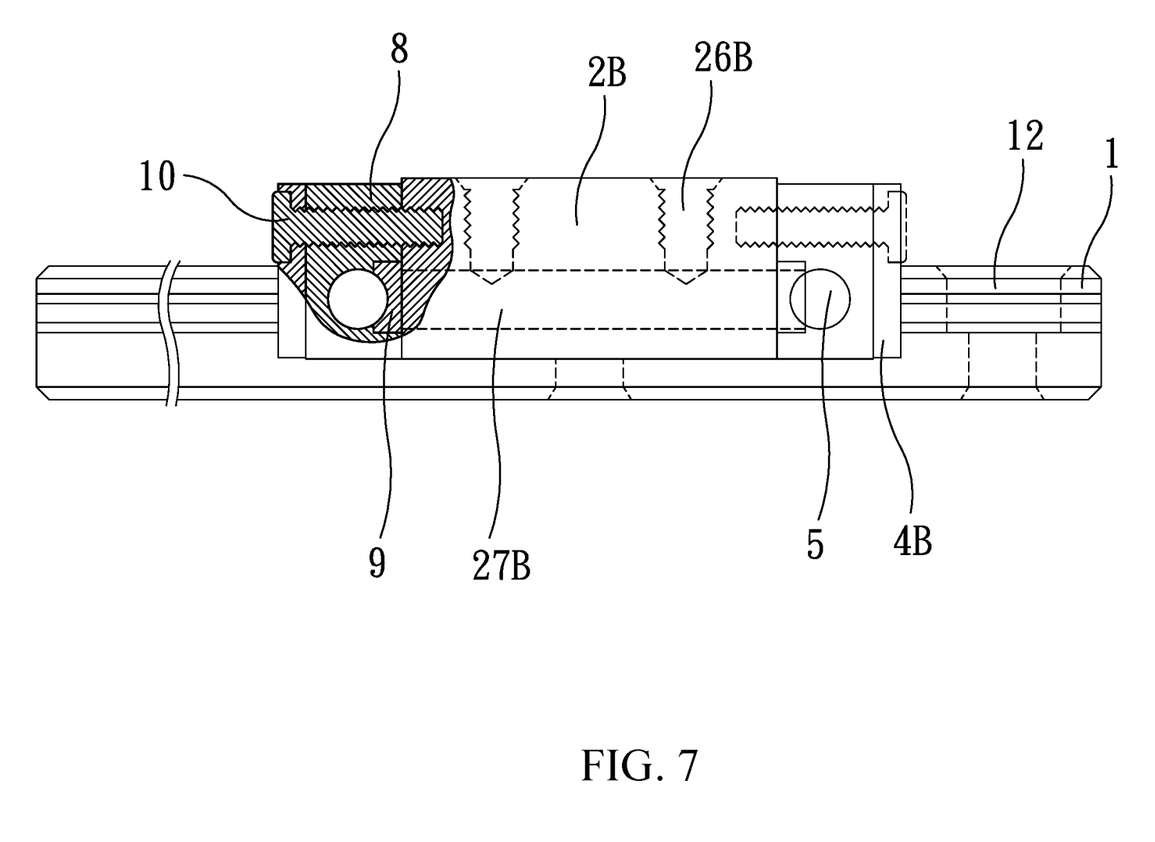
FIG. 7 is a schematic view, partly sectioned, illustrating a conventional linear ball guide.

A conventional linear ball guide is shown in FIG. 7, which comprises a rail (1), a slide block (2B), end caps (8), cover plates (9), rolling bodies (5), and wiper plates (4B). Screws (10) are used to fixe the end caps (8), the cover plate (9), and the wiper plates (4B) to the slide block (2B). The rail (1) and the slide block (2B) are respectively provided with mounting holes (12) and threaded holes (26B). The mounting holes (12) are used to fix the rail (1) to an external mechanism and the threaded holes (26B) are used to couple the slide block (2B) to a working member (not shown). The rail (1) and the slide block (2B) are both provided with ball grooves and the rolling bodies (5) are received between the ball groove of the slide block (2B) and the ball groove of the rail (1) for rolling and circulation so as to reduce the frictional resistance induced during movement of the slide block (2B) along the rail (1). The slide block (2B) has two sides each provided with an end cap (8) to allow the rolling bodies (5) to change direction. When the slide block (2B) moves along the rail (1), the rolling bodies (5) move from the ball grooves of the slide block (2B) and the rail (1), through one end cap (8), to enter a recirculation hole (27B) of the slide block (2B) and then moves from the recirculation hole (27B) through the other the end cap (8) to get back into the ball grooves of the slide block (2B) and the rail (1). As such, the slide block (2B) is allowed for movement for an unlimited length. Further, the wiper plates (4B) are mounted to outside of the end caps of the slide block (2B) to prevent foreign objects on the rail (1) to get into the ball grooves of the rail (1) and the slide block (2B). Further, the cover plates (9) are arranged inside the end caps (8) to ensure smooth circulation of the rolling bodies (5) and prevent ball jamming.

Linear ball guides have been widely used in precision machines and equipment. The size of the linear ball guides needs to be precise and miniaturized. However, the smaller the linear ball guide is, the smaller the slide block would be. When the size of the slide block is getting smaller, the size of screws involved is also getting smaller. Once the size of the screws has been reduced to a certain extent, the small size of the screws would lead to difficulty in machining threaded holes. The cost of assembling parts with the screws is increased and the time of assembling is extended. In view of the above, further improvement of the prior art is necessary.

SUMMARY OF THE INVENTION

In light of the above problems, the primary object of the present invention is to develop a linear guide that requires no screw in assembling components thereof. To achieve the above object, the present invention provides a threadless linear guide, which comprises: a rail, which is an elongate strip extending in a given direction, the direction of extension being defined as an axial direction, the rail having two opposite sidewalls on opposite sides of the axial direction and each defining a rolling groove; a slide block, which is in the form of an inverted U-shaped body, the inverted U-shaped body having two ends that are respectively provided with rolling channels respectively corresponding to the rolling grooves such that each of the rolling grooves and the corresponding rolling channel defines a loading path, an upper bottom surface being defined between two end sections, the slide block having two end faces in the axPreferably, the recirculation assembly comprises two recirculation members, the two recirculation members each have an outer configuration of a horizontal U-shape, the horizontal U-shapes of the two recirculation members each having two end sections coupled to each other to show a configuration of a rectangular frame; and the slide block is provided, in each of the two end sections of the U-shape, with a recess, the recesses respectively receiving the two end sections of the horizontal U-shapes of the recirculation members arranged therein.

Preferably, two reinforcement plates are further included and the two reinforcement plates are each of a U-shape, a fifth positioning section being formed on each of two ends of the U-shape, the fifth positioning sections and the second positioning sections being mutually coupled to each other through a recess-projection engagement arrangement therebetween, such that the reinforcement plate is fixed to an undersurface of the recirculation assembly.

The present invention provides a retaining engagement arrangement among a slide block, a recirculation assembly, and a fixing member to allow the components to be coupled to each other without screws; and a reinforcement plate is provided for reinforcing the strength of the recirculation assembly for the recirculation assembly is generally formed of injecting molding, while the fixing member and the reinforcement plate are made of metal. Thus, with the fixing member and the reinforcement plate enclosing the recirculation assembly, any foreign object jamming in the interior would not cause the rolling bodies to eject out through the recirculation assembly during the operation of rolling bodies.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring to FIGS. 1-4, the present invention provides a threadless linear guide, which comprises: a rail (1), which is an elongate strip extending in a given direction. The direction of extension is defined as an axial direction (X). The rail (1) has two opposite sidewalls on opposite sides of the axial direction (X) and each defining a rolling groove (11). A slide block (2) is in the form of an inverted U-shaped body. The inverted U-shaped body has two ends that are respectively provided with rolling channels (21) respectively corresponding to the rolling grooves (11) such that each of the rolling grooves (11) and the corresponding rolling channel (21) defines a loading path. An upper bottom surface (24) is defined between two end sections (26). The slide block (2) has two end faces in the axial direction (X) and each comprising two extension blocks (23) projecting therefrom and spaced from each other. Each of the extension blocks (23) comprises a retention slot (231) formed therein. The slide block (2) comprises fourth positioning sections (25). The slide block (2) is provided, in each of the two end sections (26) of the U-shape, with a recess (22). A recirculation assembly (A) comprises two recirculation members (3). The two recirculation members (3) each have an outer configuration of a horizontal U-shape. The horizontal U-shapes of the two recirculation members (3) each have two end sections (35) coupled to each other so that the recirculation assembly (A), as a whole, shows a configuration of a rectangular frame. The recesses (22) respectively receive the two end sections (35) of the recirculation members (3) arranged therein. The recirculation members (3) comprises third positioning sections (33) respectively corresponding to and engageable with the fourth positioning sections (25) such that the third positioning sections (33) and the fourth positioning sections (25) are mutually coupled to each other through a recess-projection engagement arrangement therebetween, where in the instant embodiment, the fourth positioning sections (25) are each a hole and the third positioning sections (33) are each a pillar, for having the recirculation assembly (A) positioning on the slide block (2). The recirculation assembly (A) has two opposite end faces (30) in the axial direction (X) and the end faces (30) are respectively jointed to and continuous with inside surfaces (2311) of the retention slots (231), as shown in FIG. 2A; or alternatively, the end faces (30) project outward beyond the inner surfaces (2311), as shown in FIG. 2B. The end faces (30) each comprise at least one first positioning section (31). The recirculation assembly (A) comprises two recirculation passageways (32) respectively connected to and communication with the two loading paths such that each of loading paths and the recirculation passageway (32) connected thereto collectively define a circulation way. A fixing member (4) comprises a connection section (41) and two positioning plates (42) respectively mounted to two ends of the connection section (41). The connection section (41) and the positioning plates (42) are all in the form of a plate. The two positioning plates (42) have a thickness that is smaller than a width of the retention slots (231). The connection section (41) is of a curved configuration without an external force acting thereon such that a spacing distance (L1) between upper end sections (422) of the two positioning plates (42) is greater than a spacing distance (L2) of lower end sections (423). This arrangement helps increase the power that the fixing member (4) fixes the recirculation assembly (A). As shown in FIG. 2A, the connection section (41) is positionable against the upper bottom surface (24) and the two positioning plates (42) are respectively positionable against the two end faces (30) of the recirculation assembly (A) with the upper end sections (422) of the two positioning plates (42) respectively inserted into the retention slots (231). The positioning plates (42) each comprise at least one second positioning section (421) corresponding to and engageable with the first positioning sections (31). In the instant embodiment, two second positioning sections (421) are provided adjacent to the lower end section (423). The first positioning sections (31) and the second positioning sections (421) are mutually coupled to each other through a recess-projection engagement arrangement therebetween, where in the instant embodiment, the first positioning sections (31) are each a raised block and the second positioning sections (421) are each an open slot, such that the fixing member (4) constrains the degree of freedom of the recirculation assembly (A) in the axial direction (X).

Figure 1:
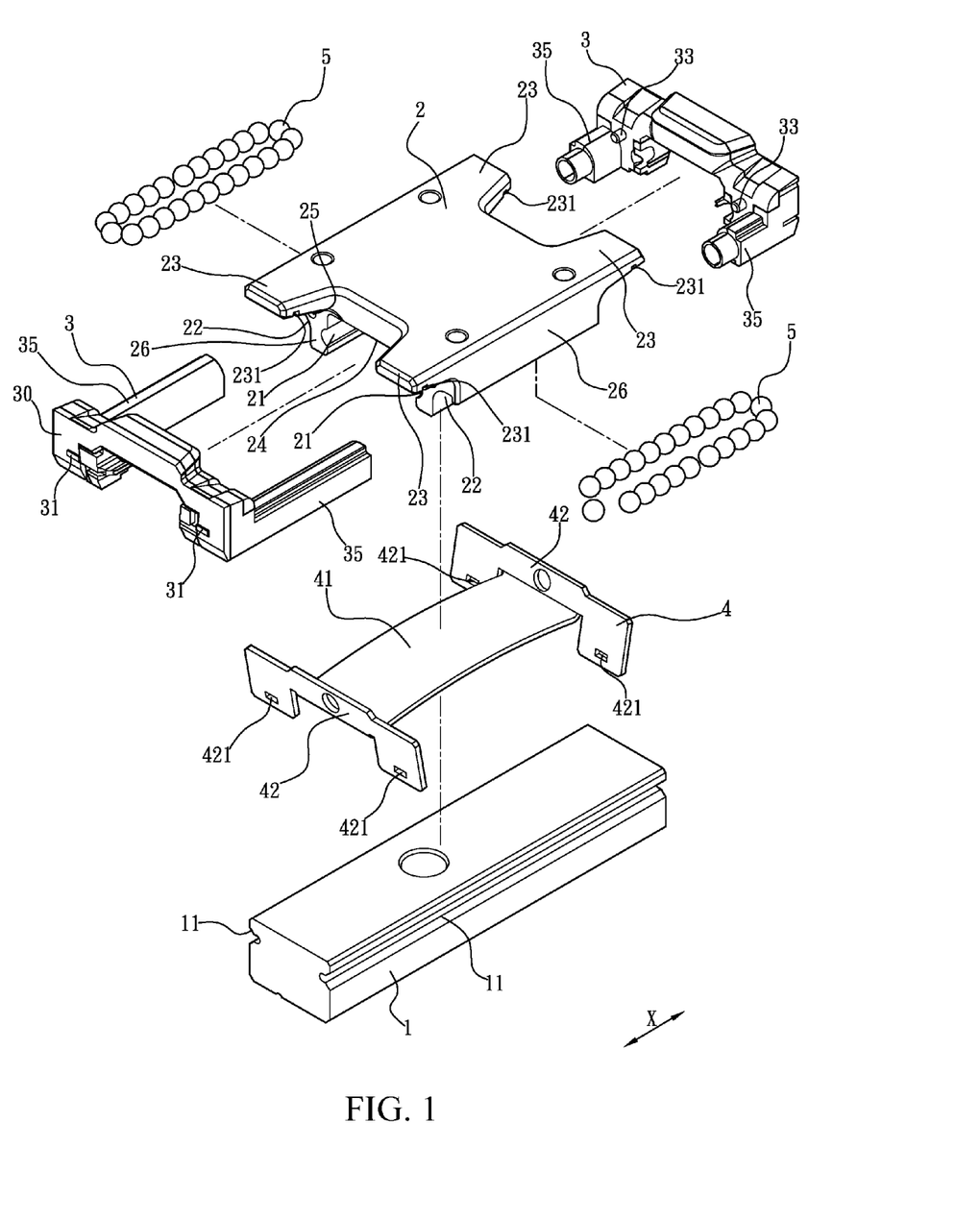
FIG. 1 is an exploded view showing a threadless linear guide according to the present invention.
Figure 2A:
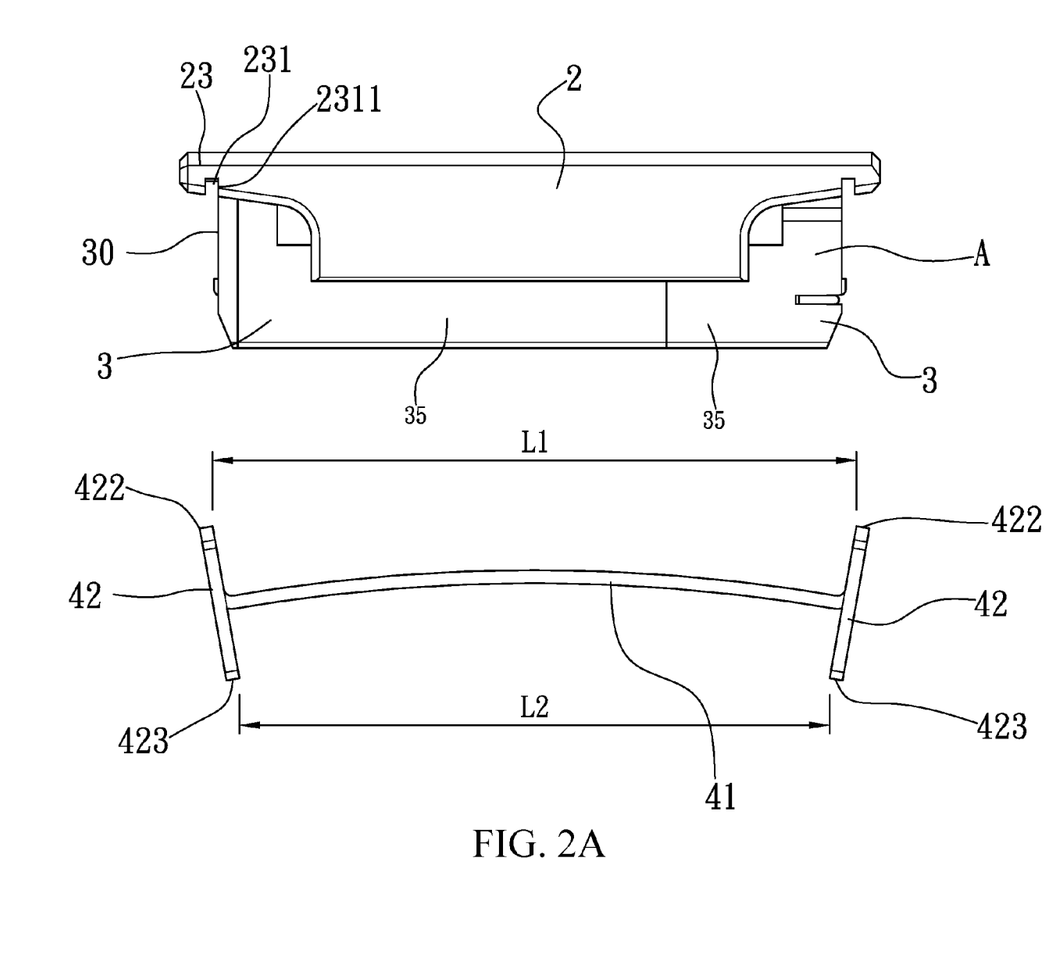
FIG. 2A is a schematic view illustrating a slide block, recirculation members, and a fixing member of the threadless linear guide according to the present invention.
Figure 2B:
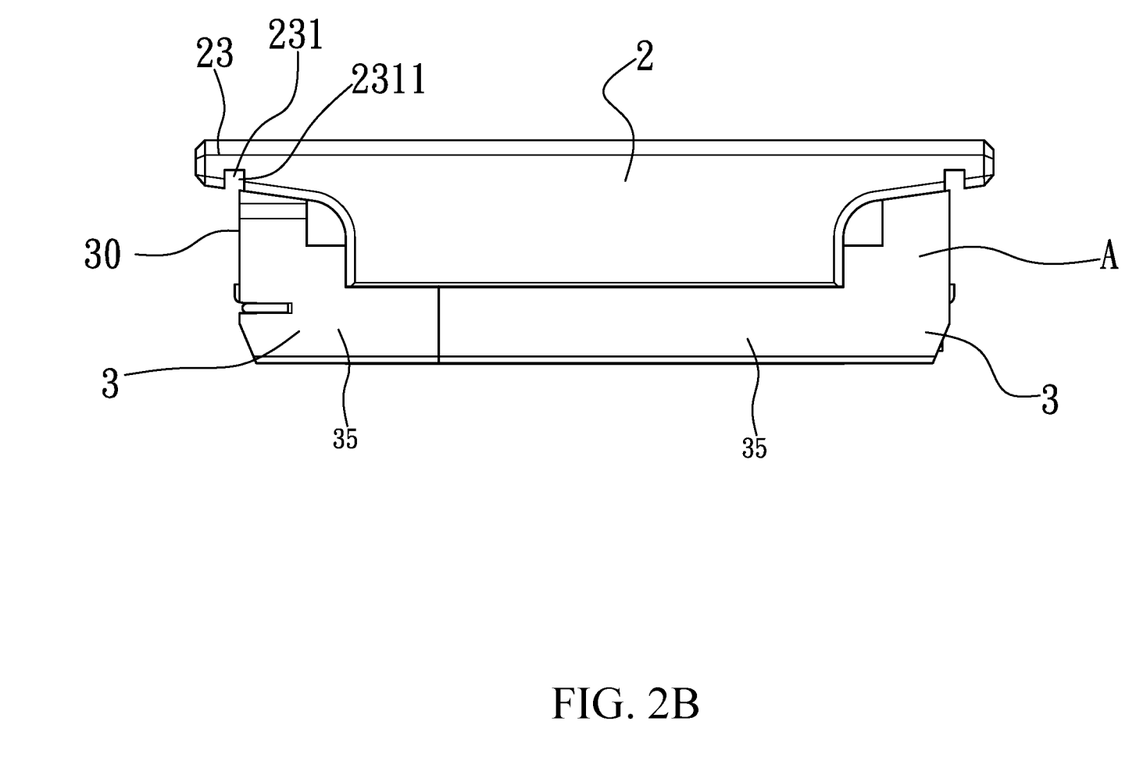
FIG. 2B is a schematic view illustrating the slide block and the recirculation members of the threadless linear guide according to the present invention.
Figure 3:
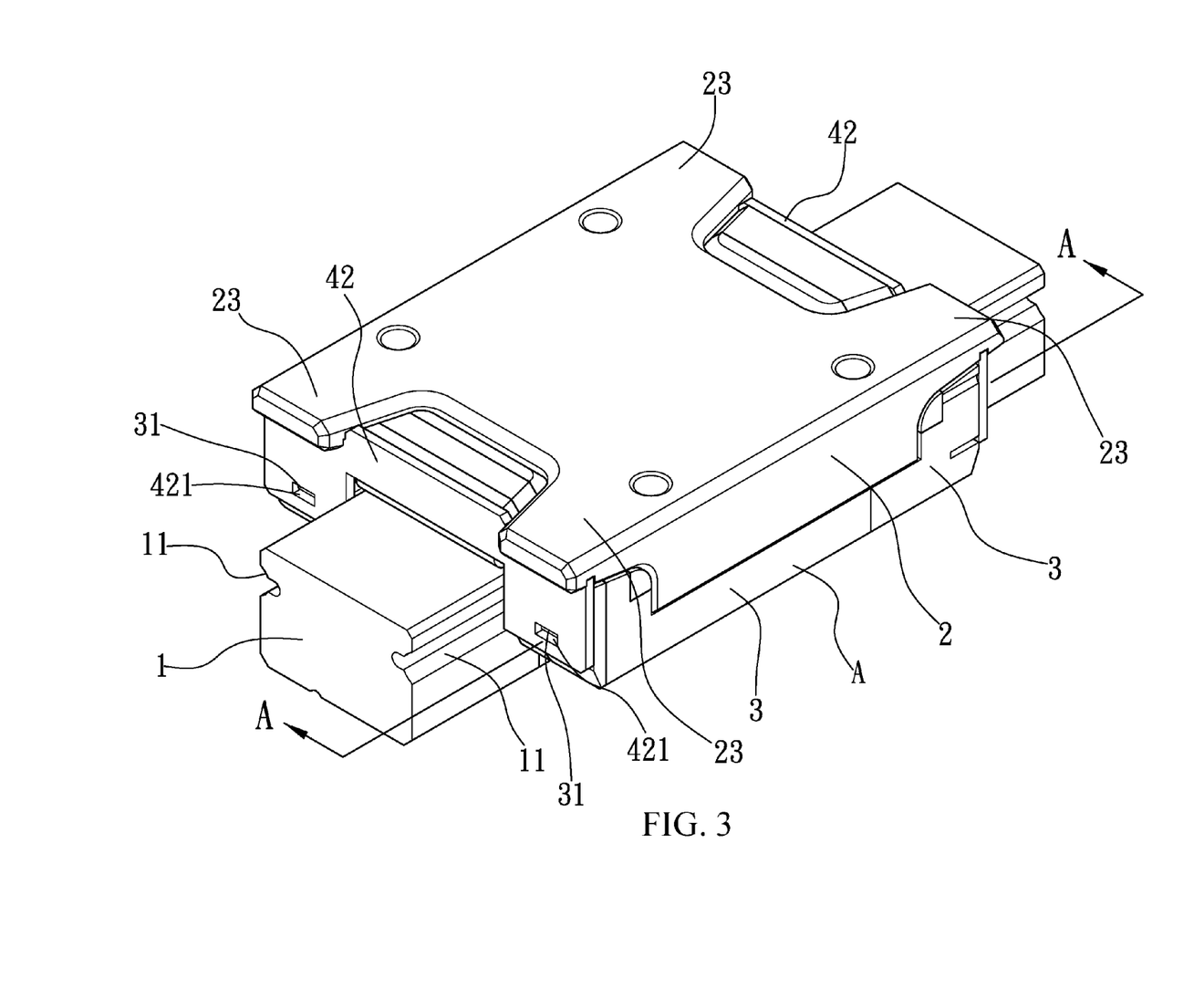
FIG. 3 is an assembled view of the threadless linear guide according to the present invention.
Figure 4:
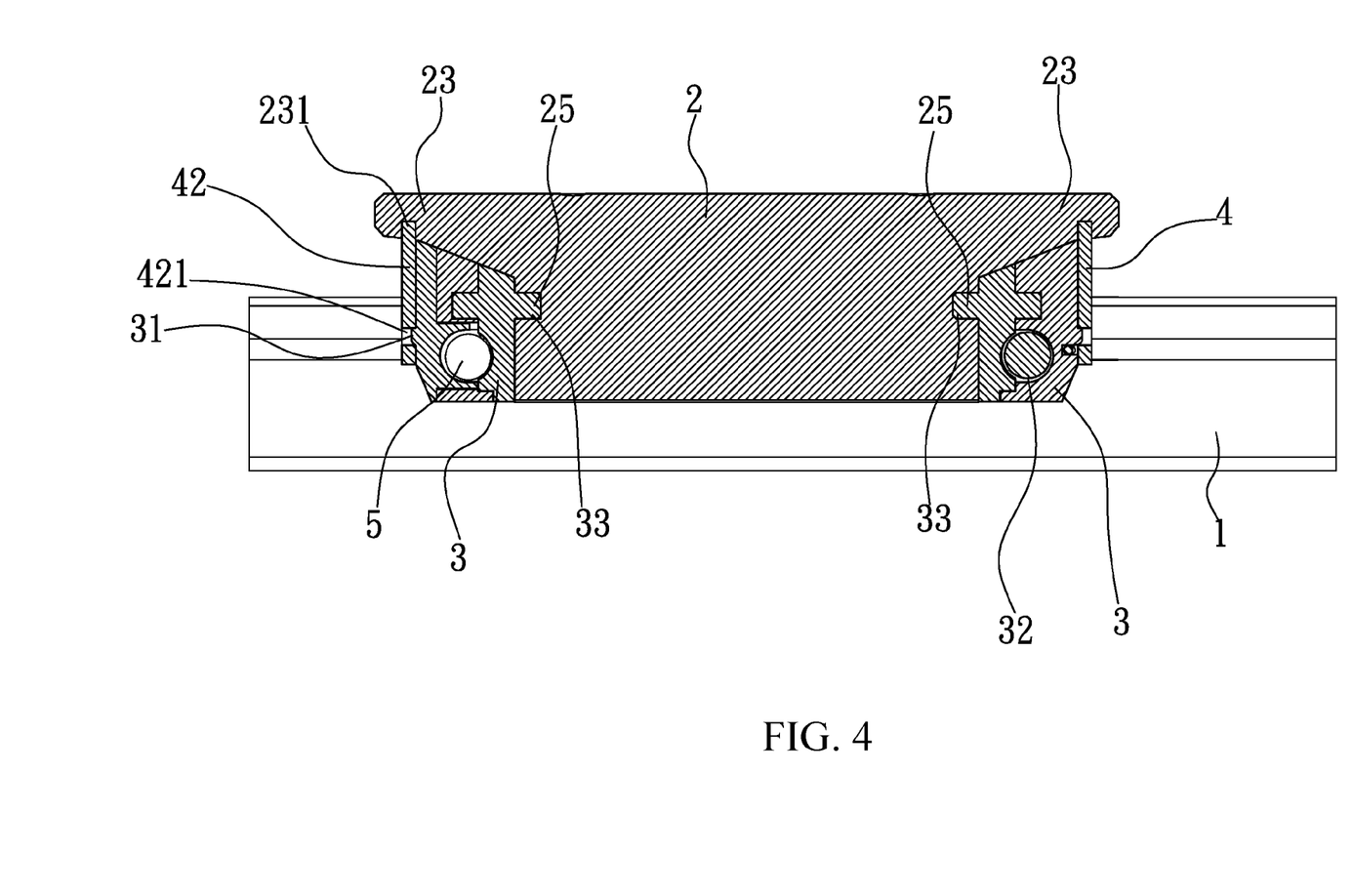
FIG. 4 is a cross-sectional view taken along line A-A of FIG. 3.
Figure 5:
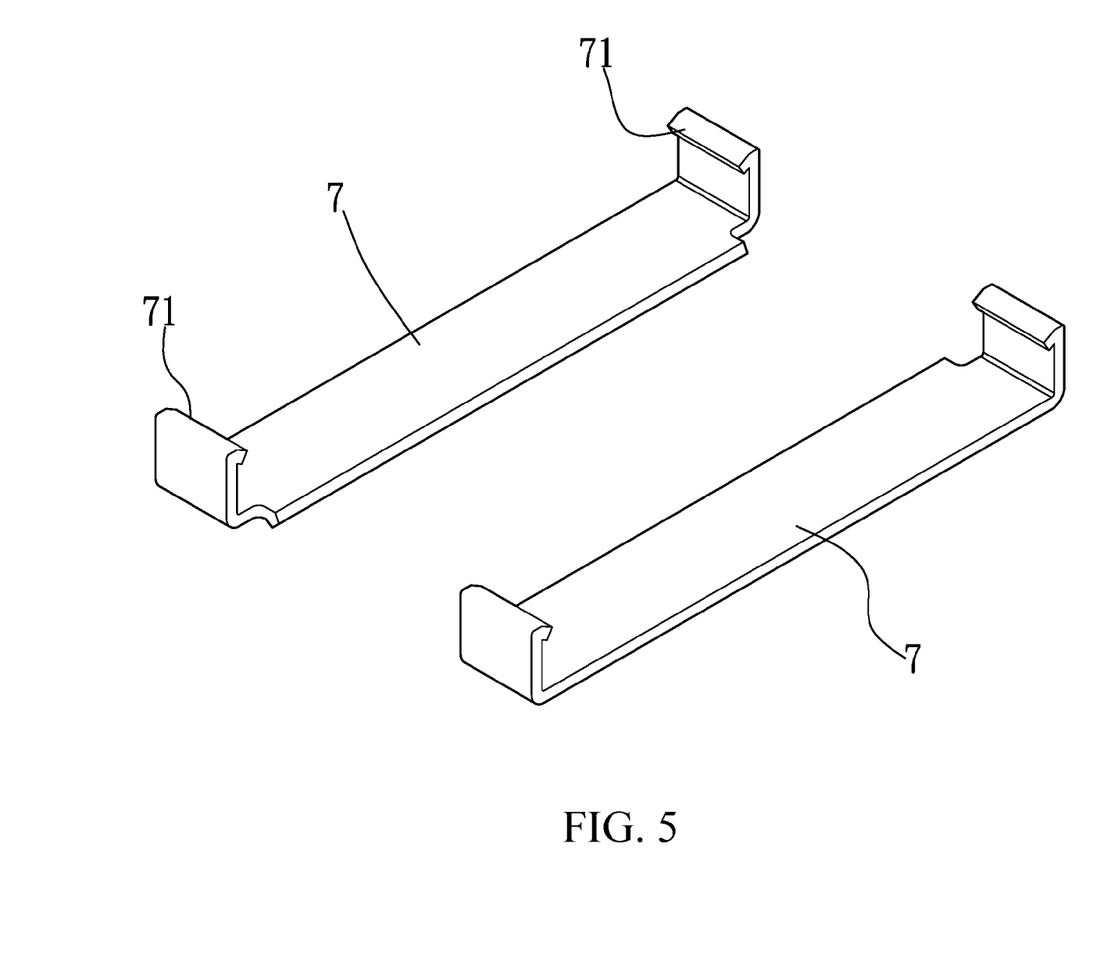
FIG. 5 is a perspective view showing a reinforcement plate of the threadless linear guide according to the present invention.
Figure 6:
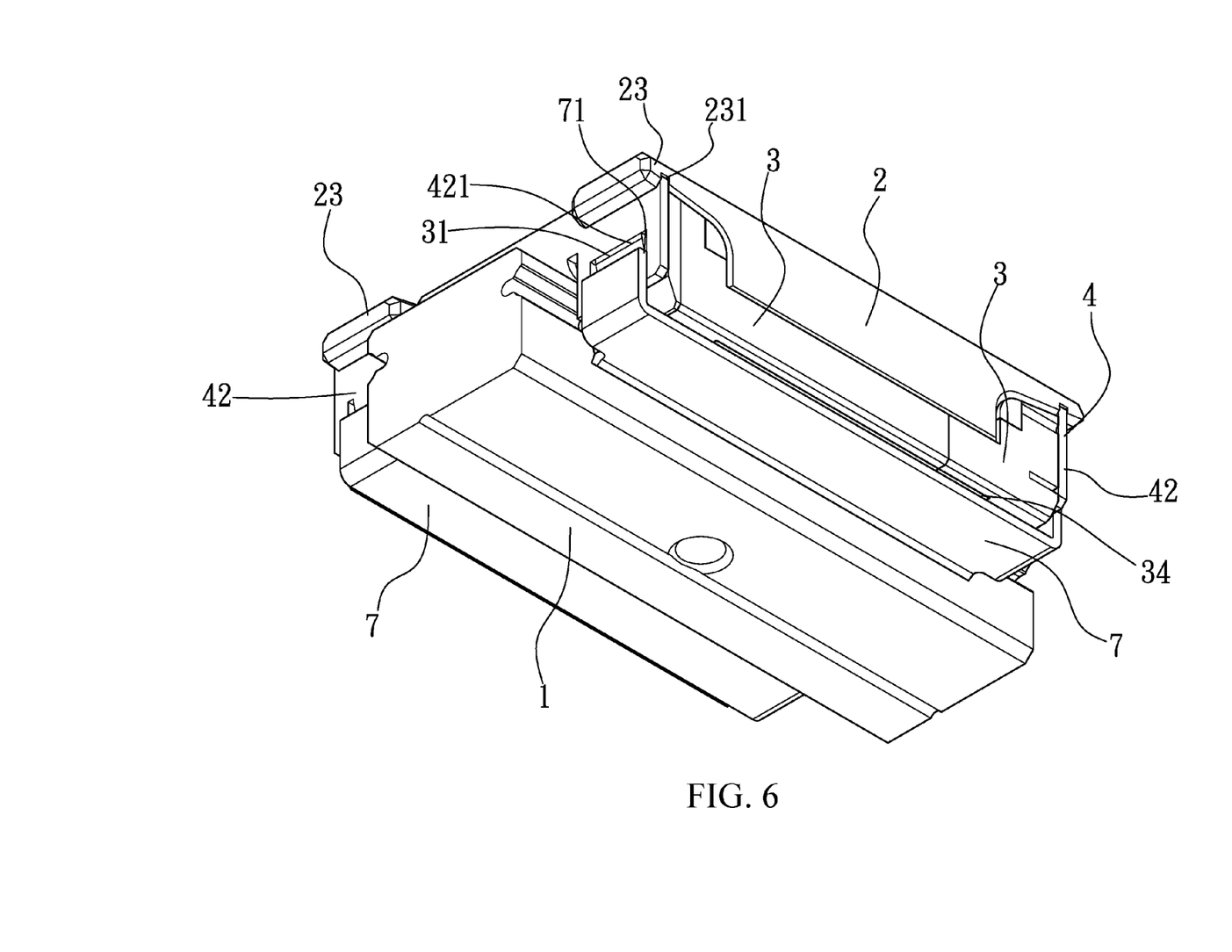
FIG. 6 is an assembled view illustrating the reinforcement plate of the threadless linear guide mounted to the slide block.

Referring to FIGS. 5 and 6, according to the present invention, to enhance the overall strength and safety of the linear guide, as shown in FIG. 5, two reinforcement plates (7) are additionally provided. The reinforcement plates (7) are each a U-shape. A fifth positioning section (71) is formed on each of two ends of the U-shape. The fifth positioning sections (71) and the second positioning sections (421) are mutually coupled to each other through a recess-projection engagement arrangement therebetween, where in the instant embodiment, the fifth positioning sections (71) are each a raised block and the second positioning sections (421) are each an open slot. To simplify the structures of the components, in the instant embodiment, the fifth positioning sections (71) and the first positioning sections (31) share the same counterpart engagement components, which are second positioning sections (421). This makes the reinforcement plate (7) fixed to an undersurface (34) of the recirculation assembly (A).

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

We claim:

1. A threadless linear guide, comprising:
   a rail, which is an elongate strip extending in a given direction, the direction of extension being defined as an axial direction, the rail having two opposite sidewalls opposing each other and extending in the axial direction and each defining a rolling groove;
   a slide block, which is in the form of an inverted U-shaped body, the inverted U-shaped body having two ends that are respectively provided with rolling channels respectively corresponding to the rolling grooves such that each of the rolling grooves and the corresponding rolling channel defines a loading path, an upper bottom surface being defined between two end sections, the slide block having two end faces in the axial direction and each comprising two extension blocks projecting therefrom and spaced from each other, each of the extension blocks comprising a retention slot formed therein, the slide block comprising first positioning sections;
   a recirculation assembly, which comprises second positioning sections respectively corresponding to and engageable with the first positioning sections such that each of the second positioning sections is engaged with a respective one of the first positioning sections through a recess-projection engagement arrangement therebetween for having the recirculation assembly positioning on the slide block, the recirculation assembly having two opposite end faces in the axial direction, the end faces being respectively jointed to inside surfaces of the retention slots, the end faces each comprising at least one third positioning section, the recirculation assembly comprising two recirculation passageways respectively connected to and communication with the two loading paths such that each of loading paths and the recirculation passageway connected thereto collectively define a circulation way; and
   a fixing member, which comprises a connection section and two positioning plates respectively mounted to two ends of the connection section, the connection section and the positioning plates being each individually plate-like, the two positioning plates having a thickness that is smaller than a width of the retention slots, the connection section being of a curved configuration without an external force acting thereon such that a spacing distance between upper end sections of the two positioning plates is greater than a spacing distance of lower end sections, the connection section being positionable against the upper bottom surface, the two positioning plates being respectively positionable against the two end faces of the recirculation assembly with the upper end sections of the two positioning plates respectively inserted into the retention slot, the positioning plates each comprising at least one fourth positioning section corresponding to and engageable with a respective one of the third positioning sections, the third positioning sections and the fourth positioning sections being mutually coupled to each other through a recess-projection engagement arrangement therebetween, such that the fixing member constrains the degree of freedom of the recirculation assembly in the axial direction.

2. The threadless linear guide according to claim 1, wherein the recirculation assembly comprises two recirculation members, the two recirculation members each have an outer configuration of a horizontal U-shape, the horizontal U-shapes of the two recirculation members each having two end sections coupled to each other to provide a rectangular frame; and the slide block is provided, in each of the two end sections of the U-shape, with a recess, the recesses respectively receiving the two end sections of the horizontal U-shapes of the recirculation members arranged therein.

3. The threadless linear guide according to claim 1 further comprising two reinforcement plates, the two reinforcement plate being each of a U-shape, a fifth positioning section being formed on each of two ends of the U-shape, the fifth positioning sections and the fourth positioning sections being mutually coupled to each other through a recess-projection engagement arrangement therebetween, such that the reinforcement plate is fixed to an undersurface of the recirculation assembly.

* * * * *